United States Patent
Fujiki

(10) Patent No.: US 6,304,896 B1
(45) Date of Patent: Oct. 16, 2001

(54) SYSTEM AND METHOD FOR DENYING CONNECTION TO ELECTRONIC MAILBOX IF MAILBOX IS EMPTY

(75) Inventor: Shinobu Fujiki, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/161,874

(22) Filed: Sep. 28, 1998

(30) Foreign Application Priority Data

Sep. 29, 1997 (JP) .................................................. 9-264632

(51) Int. Cl.⁷ .............................. G06F 15/16; H04M 1/64
(52) U.S. Cl. ....................... 709/206; 709/227; 379/88.12
(58) Field of Search .................................. 709/206, 207, 709/227, 228, 237, 225, 229; 379/88.12, 88.17, 88.25, 93.02, 93.24, 93, 22, 93.35; 340/825.06; 455/412, 413

(56) References Cited

U.S. PATENT DOCUMENTS

| | | | | |
|---|---|---|---|---|
| 5,033,077 | * | 7/1991 | Bergeron et al. | 379/88.12 |
| 5,475,737 | * | 12/1995 | Garner et al. | 379/88.26 |
| 5,675,507 | * | 10/1997 | Bobo, II | 709/206 |
| 5,864,684 | * | 1/1999 | Nielsen | 709/206 |
| 5,896,504 | * | 4/1999 | Shiraki | 709/206 |
| 5,944,786 | * | 8/1999 | Quinn | 709/206 |
| 5,956,486 | * | 9/1999 | Hickman et al. | 709/206 |
| 5,961,590 | * | 10/1999 | Mendez et al. | 709/206 |
| 5,966,714 | * | 10/1999 | Huang et al. | 707/201 |
| 5,987,609 | * | 11/1999 | Hasebe | 713/200 |
| 6,052,442 | * | 4/2000 | Cooper et al. | 379/88.19 |
| 6,061,718 | * | 5/2000 | Nelson | 709/206 |
| 6,067,561 | * | 5/2000 | Dillon | 709/206 |
| 6,108,329 | * | 8/2000 | Oyama et al. | 370/352 |
| 6,118,856 | * | 9/2000 | Paarsmarkt et al. | 379/93.24 |
| 6,128,101 | * | 10/2000 | Saito | 358/402 |
| 6,141,695 | * | 10/2000 | Sekiguchi et al. | 709/246 |
| 6,212,265 | * | 4/2001 | Duphorne | 379/142.15 |
| 6,230,156 | * | 5/2001 | Hussey | 707/10 |

FOREIGN PATENT DOCUMENTS 8-331358   12/1996 (JP) .
9-264632   10/1997 (JP) .

OTHER PUBLICATIONS

Dorner et al., "Remote Mail Checking Protocol", RFC 1339, pp. 1–11, Jun. 1992.*
Myers et al., "Post Office Protocol—Version 3", RFC 1939, pp. 1–41, May 1996.*

* cited by examiner

Primary Examiner—Mark H. Rinehart
Assistant Examiner—Jason D. Cardone
(74) Attorney, Agent, or Firm—Hogan & Hartson, L.L.P.

(57) ABSTRACT

A communication system adapted to send and receive electronic mail between terminal devices through a server and digital data network such that a user of calling terminal device would incur no communication expense when there is no electronic mail addressed to the calling terminal device even if the calling terminal device makes a call to the server. The server extracts an address of a calling terminal device and determines whether there is any electronic mail addressed to the calling terminal device before establishing line connection between the calling terminal device and itself. The server then refuses the call from the calling terminal device if there is no electronic mail addressed to the calling terminal device.

19 Claims, 3 Drawing Sheets

SYSTEM AND METHOD FOR DENYING CONNECTION TO ELECTRONIC MAILBOX IF MAILBOX IS EMPTY

BACKGROUND OF THE INVENTION

1. Field of the Invention

The present invention relates to a communication system and method for sending and receiving electronic mail between communication terminal devices via a server and digital data network.

2. Description of the Related Art

In recent years, computer communication networks such as Internet are developing. This is because, for example, the computer communication networks are advantageous in error correction and a user can communicate with computers in a user's own country and even in other countries by only bearing a communication expense (line usage fee and provider fee) from a user's computer (terminal device) to a provider. The provider is a company that provides communication service between the user's computer and computer network. The user generally contracts a nearby provider through a digital network such as ISDN (Integrated Services Digital Network).

When the user connects his or her terminal device to a server computer of the provider on ISDN network to attempt receiving (downloading) electronic mail addressed to himself or herself, the user must bear a communication cost even if there is no electronic mail addressed to himself or herself since the user's computer is once connected to the server computer. One example of such conventional communication systems is disclosed in Japanese Patent Application, Laid-Open Publication No. 8-331358.

SUMMARY OF THE INVENTION

One object of the present invention is to provide a communication system and method that can avoid any payment if there is no electronic mail addressed to a user in a mail box of a server. Specifically, when a user's terminal device calls the server but the server does not hold any electronic mail addressed to the user's terminal device, the communication system of the present invention does not incur any communication expense.

According to one aspect of the present invention, there is provided a communication system adapted to send and receive electronic mail between communication terminal devices through a server and digital data network, characterized in that the server includes means for extracting an address of a communication terminal device that is calling the server, means for determining whether there is any electronic mail addressed to the calling terminal device, and means for refusing a call from the calling terminal device if there is no electronic mail addressed to the calling terminal device.

When one of the terminal devices makes a call to the server, the server extracts the address of the calling terminal device from, for instance, user-to-user information (UUI) of D channel on ISDN network. Then, the server checks mail boxes to find out if there is any electronic mail addressed to the calling terminal device. If no such mail is found, the server does not accept the call from the calling terminal device. Therefore, no connection is established between the calling terminal device and server and no communication expense would arise when there is no electronic mail addressed to the calling terminal device. As a result, crowdedness on the communication line is avoided.

The communication system of the invention may cause the calling terminal device to stop calling to the server when the server refuses the call from the calling terminal device. In other words, when the server refuses the call, the calling terminal device may determine that there is no electronic mail addressed to itself and switch to a stand-by condition. Accordingly, wasteful connection between the server and calling terminal device is avoided.

If the server extracts the address of the calling terminal device and particular information about electronic mail to be sent to another terminal device, the server may accept the call from the calling terminal device to receive the electronic mail from the calling terminal device regardless of presence or absence of electronic mail addressed to the calling terminal device. When UUI from the calling terminal device carries both the address of the calling terminal device and particular information indicative of presence of electronic mail addressed to a remote terminal device, the server always establishes connection between the calling terminal device and itself even if there is no electronic mail directed to the calling terminal device. Therefore, the call from the calling terminal device is accepted by the server if the calling terminal device wants to send electronic mail to another terminal device. No inconvenience would occur when sending electronic mail.

According to another aspect of the present invention, there is provided a communication method for sending and receiving electronic mail between terminal devices through a server and digital data network, comprising the step of causing the server to refuse a call from a calling terminal device unless the server has electronic mail directed to the calling terminal device in its mailbox. In this communication method, no connection is established between the calling terminal device and server when there is no electronic mail addressed to the calling terminal device. Accordingly, a user of the calling terminal device would incur no expense when there is no electronic mail addressed to the calling terminal device. The method may further include the step of causing the calling terminal device to switch to a stand-by condition when the server refuses the call from the calling terminal device.

DETAILED DESCRIPTION OF THE INVENTION

Now, an embodiment of a communication system according to the present invention will be described in reference to the drawings. In the following description, image data is sent to a remote terminal device in the form of electronic mail through Internet. Internet is one example of computer communication networks to which teaching of the present invention is applicable.

Figure 1:
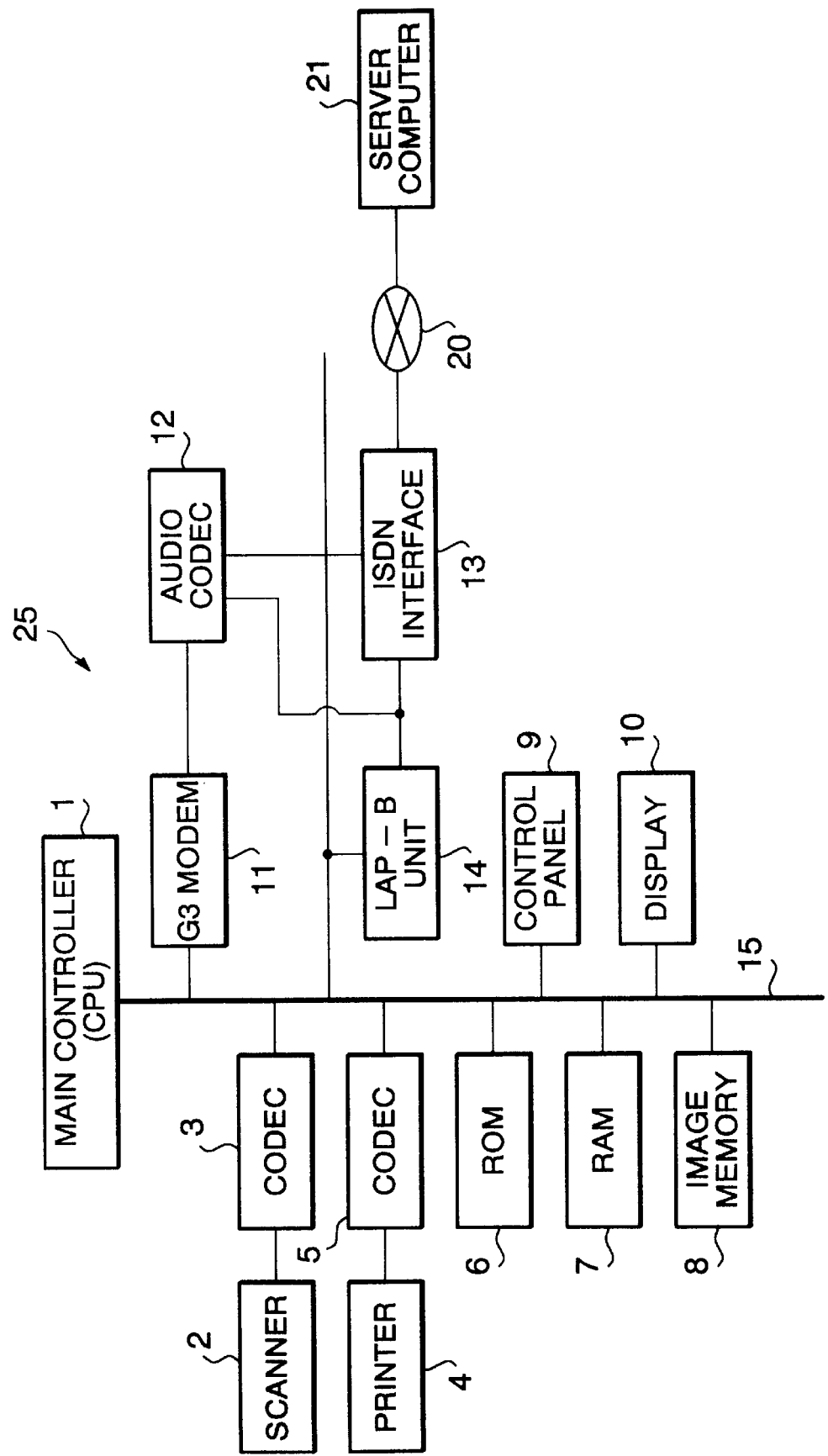
FIG. 1 is a block diagram illustrating a hardware structure of a communication system according to the present invention.

Referring to FIG. 1, illustrated is a hardware of the communication system. The illustrated communication system mainly includes a communication terminal device 25, ISDN network 20 and server computer 21. The communication terminal device 25 can perform conventional Groups 3 and 4 facsimile communication (International Telecommunication Union (ITU)-T, Recommendations T.4 and T.6) and can also communicate with other terminal devices (not shown) over Internet.

A main controller 1 is CPU connected with various hardware elements (will be described) by a bus 15. The main controller 1 controls these hardware elements and also executes various software. A scanner 2 includes, for example, CCD to scan an original document. The resulting data is fed to a codec 3 and converted to black and white binary data (image data) by the codec 3.

A printer 4 is, for example, an electrophotographic printer. Image data is input to the printer 4 from another codec 5 and printed out from the printer 4 as a hard copy. The image data includes those sent from a remote facsimile machine and sent from Internet.

ROM 6 beforehand stores various programs needed for operations of the communication terminal device 25. RAM 7 includes SRAM, flash memory or the like to temporarily store data generated during execution of particular software. An image memory 8 includes DRAM or the like to store image data to be sent to or received from a remote terminal device.

A control panel 9 includes alphabetic keys, numeric keys, quick dial keys, one-touch dial keys and function keys which are used to operate the communication terminal device 25. A display 10 includes LCD, CRT display or the like to indicate an operating condition of the terminal device 25 and image data to be sent to or received from a remote terminal device.

A G3 modem 11 converts image data to analog voice (audio) signal and vice versa. An audio codec 12 converts between analog audio signal and digital data. An ISDN interface 13 serves as an interface to the ISDN network 20 extending to the server computer 21 of a provider. The ISDN interface 13 includes an S interface function and LAP-D (Link Access Procedure-D channel) function. The S interface is an interface at an S point and has a protocol processing function, maintenance function and interface function. The LAP-D function is utilized to control a protocol for D channel of ISDN. A LAP-B (Link Access Procedure-Balanced mode) unit 14 controls a B channel protocol of ISDN for data communication.

The communication terminal device 25 possesses the above described hardware structure, and is equipped with G3 and G4 facsimile communication function as well as electronic mail function. The terminal device 25 is adapted to send and receive image data in the form of electronic mail. The image data is generally converted to a TIFF (Tagged Image File Format) when sent into Internet. Specifically, the image data which is originally prepared for facsimile communication is converted to TIFF and transmitted over Internet as electronic mail. Functions needed for this data format conversion and transmission are stored in ROM 6 in the form of software.

Now, an operation of the communication system according to the present invention will be described.

When there is a call to the server 21 from the communication terminal device 25 of a user, the communication system controls acceptance and refusal of the call depending upon presence and absence of electronic mail addressed to the calling communication terminal device 25. However, if the user's communication terminal device 25 has electronic mail to be sent to a remote terminal device, the call to the server from the user's communication terminal device is always accepted by the server regardless of presence and absence of electronic mail addressed to the user's communication terminal device.

Figure 2:
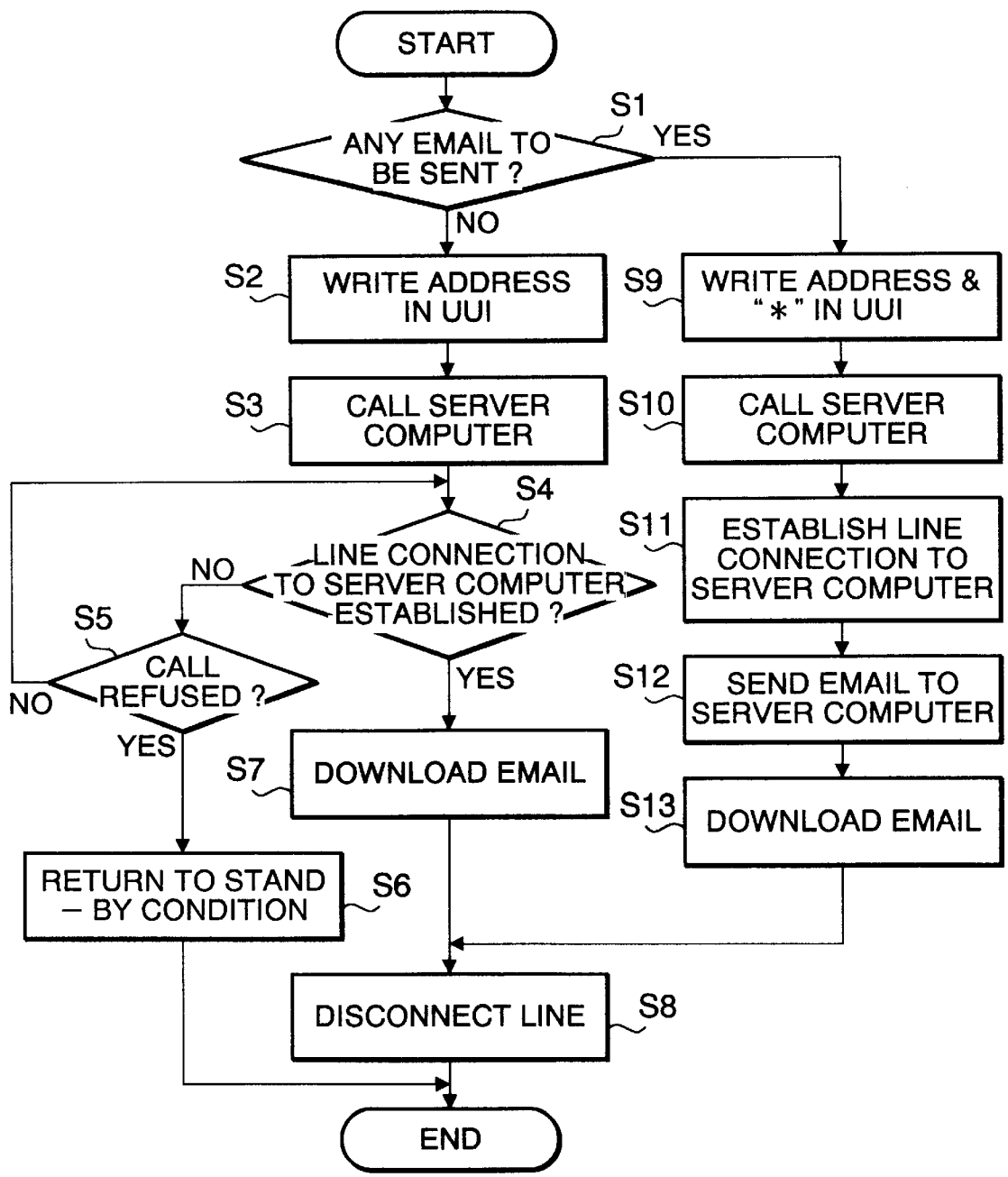
FIG. 2 is a flowchart illustrating operations of a communication terminal device of the communication system shown in FIG. 1.
Figure 3:
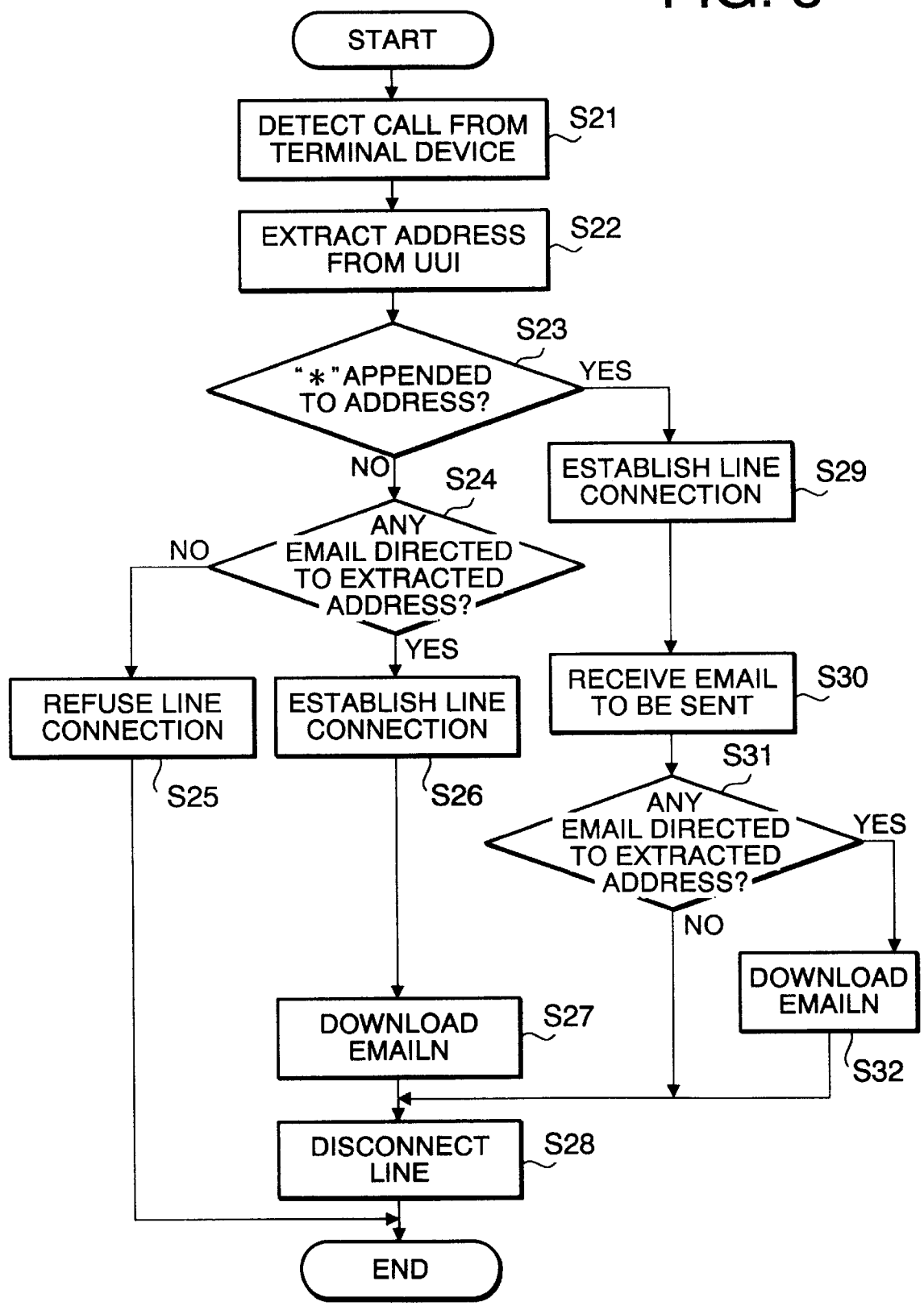
FIG. 3 is a flowchart illustrating operations of a server of the communication system shown in FIG. 1.

A concrete example of operation executed by the communication system of the invention will be described in reference to the flowchart shown in FIGS. 2 and 3. FIG. 2 illustrates a procedure on the user's communication terminal device and FIG. 3 illustrates a procedure on the server.

Referring first to FIG. 2, it is first determined whether the user's communication terminal device 25 has electronic mail to be sent to a remote terminal device (step S1). If there is no electronic mail to be sent (NO at step S1), the user's communication terminal device writes its own address in UUI of D channel (step S2) and makes a call to the server computer 21 (step S3). Then, it is determined whether line connection to the server computer 21 is established (step S4). If the answer is NO at step S4, it is determined whether the server computer 21 has refused the call (step S5). A positive answer (YES) at step S5 means that the server computer 21 does not have any electronic mail addressed to the user's communication terminal device. The user's communication terminal device is then brought into a stand-by condition (step S6), and the program proceeds to END.

Successful connection between the server computer 21 and user's communication terminal device 25 (YES at step S4) means presence of electronic mail directed to the user's communication terminal device 25 in the server computer 21. Therefore, the user's communication terminal device 25 downloads the electronic mail (step S7) and subsequently disconnects the line (step S8). The program proceeds to END after step S8.

When the communication terminal device 25 has electronic mail to be sent to a remote terminal device (YES at step S1), it writes the address and "*" in UUI (step S9) and calls the server computer (step S10). "*" represents information indicating presence of electronic mail addressed to a remote terminal device. Upon detecting the call from the communication terminal device 25 together with the terminal device address and "*", the server establishes connection between the calling terminal device 25 and itself at step S11. The communication terminal device 25 then transmits the electronic mail to the server computer 21 (step S12). This electronic mail is sent to a desired destination from the server computer 21. If the server computer 21 also holds electronic mail addressed to the communication terminal device 25, the communication terminal device 25 downloads the electronic mail (step S13) and cuts the line connection (step S8).

Next, the operation of the server computer 21 will be described in reference to FIG. 3. The server computer 21 detects a call from the communication terminal device 25 (step S21). Then, the server computer 21 extracts the address of the communication terminal device 25 from UUI of D channel (step S22). It is subsequently determined whether "*" is appended to the tail of the extracted address (step S23). If no "*" is found (NO at step S23), the server computer 21 determines whether it has electronic mail addressed to the extracted address (step S24).

If there is no electronic mail directed to the communication terminal device 25 (NO at step S24), the server computer 21 refuses the call from the communication terminal device 25 (step S25) and the program proceeds to END. On the other hand, if there is such electronic mail (YES at step S24), the server computer 21 establishes line connection to the calling communication terminal device 25 (step S26) and allows downloading of the electronic mail to the communication terminal device 25 (step S27). Upon completion of electronic mail downloading, the line connection is cut (step S28) and the program proceeds to END.

When "*" is appended to the end of the extracted address (YES at S23), the server computer 21 establishes line connection (step S29) and receives electronic mail from the communication terminal device 25 (step S30). Then, the server computer 21 determines whether it stores electronic mail directed to the communication terminal device 25 (i.e., the extracted address) (step S31). If the answer is YES, the server computer 21 downloads such electronic mail to the addressed communication terminal device 25 (step S32) and disconnects the line (step S28). When there is no electronic mail addressed to the communication terminal device 25 (NO at S31), the server computer 21 cuts the line connection (step S28) and the program proceeds to END.

The communication system and method described above are disclosed in Japanese Patent Application No. 9-264632 filed with JPO on Sep. 29, 1997, and the entire disclosure thereof is incorporated herein by reference.

What is claimed is:

1. A communication system adapted to send and receive electronic mail between communication terminal devices via a server and digital data network, wherein the server includes:

means for extracting an address of a calling terminal device that calls the server;

means for determining whether the server holds electronic mail directed to the extracted address and delivered from another terminal device before a line connection is made between the server and the calling terminal device thereby preventing a communication expense from being incurred by the communication system; and means for refusing a call from the calling terminal device if there is no electronic mail directed to the extracted address such that the communication system does not incur the communication expense.

2. The communication system of claim 1, wherein the calling terminal device includes means for stopping calling the server when the server refuses the call from the calling terminal device.

3. The communication system of claim 2 further including means for bringing the calling terminal device into a stand-by condition when the calling terminal device stops calling the server.

4. The communication system of claim 1, wherein the server further includes means for accepting the call from the calling terminal device to receive from the calling terminal device electronic mail addressed to a remote terminal device regardless of determination made by the determination means when the address extracting means extracts the address of the calling terminal device and predetermined information indicative of presence of electronic mail to be sent to a remote terminal device.

5. The communication system of claim 4, wherein the calling terminal device includes means for determining whether there is electronic mail to be sent to a remote terminal device, means for calling the server using the address of the calling terminal device when there is no electronic mail to be sent to a remote terminal device and using the address of the calling terminal device and predetermined information when there is electronic mail to be sent to a remote terminal device, means for determining whether the server refuses the call from the calling terminal device, and means for transmitting electronic mail to the server when the server does not refuse the call from the calling terminal device.

6. The communication system of claim 1, wherein the calling terminal device possesses Groups 3 and 4 facsimile communication function and electronic mail function.

7. A communication method for sending and receiving electronic mail between terminal devices through a server and a digital data network, comprising the steps of:

A) causing a terminal device to call a server and to send an address of the terminal device to the server;

B) causing the server to extract the address of the calling terminal device that calls the server;

C) causing the server to determine whether the server holds electronic mail directed to the extracted address and delivered from another terminal device before a line connection is made between the server and the calling terminal device thereby preventing a communication expense from being incurred by the communication system; and D) causing the server to refuse the call from the calling terminal device when the step C determines that there is no electronic mail directed to the extracted address such that the communication system does not incur the communication expense.

8. The communication method of claim 7 further including the steps of:

E) determining whether there is electronic mail to be sent to a remote communication terminal device from the calling terminal device before the step B; and F) forcing the server to accept the call from the calling terminal device if the step E determines that there is electronic mail to be sent to a remote communication terminal device, regardless of determination made by the server in step C).

9. The communication method of claim 8 further including the steps of:

G) causing the calling terminal device to send to the server predetermined information indicating presence of electronic mail to be sent to a remote communication terminal device between the steps E and B if the step E determines that there is electronic mail addressed to a remote communication terminal device; and H) causing the server to detect the predetermined information before the step F.

10. The communication method of claim 7 further including the step of E) causing the server to accept the call from the calling terminal device so as to allow downloading of electronic mail to the calling terminal device when the step C determines that there is electronic mail directed to the extracted address.

11. The communication method of claim 7 further including the step of E causing the calling terminal device to switch to a stand-by condition when the server refuses the call from the calling terminal device in step D.

12. A server used in network communication for sending and receiving electronic mail between communication terminal devices via the server and network, wherein the server holds electronic mail addressed to a calling terminal device on the network and delivered from another terminal before a line connection is made between the server and the calling terminal device thereby preventing a communication expense from being incurred by the communication system, and wherein the server refuses to establish the line connection between the server and the calling terminal device if there is no electronic mail addressed to the calling terminal device on the network such that the communication system does not incur a communication expense.

13. The server of claim 12 further including means for extracting an electronic mail address of the terminal device and means for determining whether there is an electronic mail addressed to the terminal device, based on the extracted electronic mail address.

14. The server of claim 13 further including means for establishing line connection between the sever and terminal device if predetermined information is also extracted together with the electronic mail address regardless of presence and absence of the electronic mail addressed to the terminal device.

15. A communication method for sending and receiving electronic mail between terminal devices through a server and network, comprising the steps of:

determining whether the server holds electronic mail addressed to a calling terminal device on the network and delivered from another terminal device before a line connection is made between the server and the calling terminal device thereby preventing a communication expense from being incurred by the communication system; and refusing to establish the line connection between the server and the calling terminal device if there is no electronic mail addressed to the calling terminal device on the network such that the communication system does not incur a communication expense.

16. The communication method of claim 15 further including the step of bringing the calling terminal device to a stand-by condition when line connection between the server and calling terminal device is not established.

17. The communication method of claim 15 wherein the network is a digital data network.

18. A communication method for sending and receiving electronic mail between terminal devices through a server and a digital data network, comprising the steps of:

A) causing a calling terminal device to determine whether there is electronic mail to be sent to a remote terminal device;

B) causing the calling terminal device to call a server and to send an address of the terminal device and predetermined information to the server when there is electronic mail to be sent to a remote terminal device and to call the server and send the address of the calling terminal device when there is no electronic mail to be sent to a remote terminal device;

C) causing the server to extract the address of the calling terminal device that calls the server and predetermined information;

D) causing the server to accept the call from the calling terminal device so as to receive electronic mail from the calling terminal device when the step C extracts the calling terminal device address and predetermined information;

E) causing the server to determine whether the server holds electronic mail directed to the extracted address and delivered from another terminal device before a line connection is made between the server and the calling terminal device thereby preventing a communication expense from being incurred by the communication system when step C only extract the calling terminal device address; and F) causing the server to refuse the call from the calling terminal device when the step E determines that there is no electronic mail directed to the extracted address such that the communication system does not incur the communication expense;

G) causing the server to accept the call from the calling terminal device when the step E determines that there is electronic mail directed to the extracted address; and H) causing the server to allow downloading to the calling terminal device so as to receive electronic mail directed to the extracted address after the step D or G.

19. The communication method of claim 18 further including the step of causing the calling terminal device to switch to a stand-by condition when the server refuses the call in the step F.

* * * * *